United States Patent [19]
Eichweber

[11] 4,215,270
[45] Jul. 29, 1980

[54] VARIABLE OPTICAL TRANSMITTER

[75] Inventor: Kurt Eichweber, Hamburg, Fed. Rep. of Germany

[73] Assignee: Precitronic Gesellschaft fur Feinmechanik und Electronic mbH, Fed. Rep. of Germany

[21] Appl. No.: 881,625

[22] Filed: Feb. 27, 1978

[30] Foreign Application Priority Data

Mar. 30, 1977 [DE] Fed. Rep. of Germany ....... 2714177

[51] Int. Cl.$^2$ ................................................ G01J 1/20
[52] U.S. Cl. ..................................... 250/201; 356/247
[58] Field of Search ....................... 250/203, 201, 199; 356/247, 248, 400, 141, 152

[56] References Cited
U.S. PATENT DOCUMENTS

| | | | |
|---|---|---|---|
| 3,961,179 | 6/1976 | Kuffer | 250/203 R |
| 4,107,530 | 8/1978 | Brumfield et al. | 250/203 R X |
| 4,111,564 | 9/1978 | Trice | 356/247 |

*Primary Examiner*—David C. Nelms
*Assistant Examiner*—Darwin R. Hostetter

[57] ABSTRACT

A variable optical transmitter includes a light emitting element which projects a very compact beam of light. The transmitter is constructed to be adjustable so that the light beam may be transmitted at any desired azimuth angle around a vertical axis. By directing the light beam vertically toward a fixed reflector, projection of the beam in any desired horizontal direction may be achieved by a very slight deflection of the beam source from the vertical. The apparatus may also include a receiving portion which will detect the direction of receipt of an incoming light beam. The device may thus be used to transmit a light beam precisely in the direction from which a signal was received.

11 Claims, 3 Drawing Figures

VARIABLE OPTICAL TRANSMITTER

BACKGROUND OF THE INVENTION

1. Field of the Invention

This invention relates to apparatus for transmitting directional light beams, and more particularly, to apparatus for transmitting a light beam in any desired horizontal direction.

2. Description of the Prior Art

A very precise aim of a light beam toward the location of a receiving station is needed for a communication system operating with the optical transmission of signals, especially where a laser beam of coherent light in the visible or in the infrared range is utilized. When a signal must be sent in response to a query signal, an exact determination of the direction from which the query signal was sent is necessary, and an appropriate transmission of the reply message must be made in this same direction. For many operations, in which response signals must contact several querying stations in rapid succession, or must reach a station which is moving rapidly from place to place, the directional tuning or tracking of the transmitter to the specific point of origin of each received signal must be accomplished within an extremely short time after receipt of the signal.

In hitherto available variable light transmitters, which direct a light ray at any desired azimuth angle with respect to a vertical axis, a light ray emitting element is utilized which may be rotated around the vertical axis. This element may be either the light source itself, such as a laser, or a reflector, prism, or similar optical element, which deflects the direction of the light beam. Thus, if the direction of transmission must be changed by an angle $\phi$, the emission element must be rotated by the same angle $\phi$ about the vertical axis. When the direction of transmission changes rapidly, rotations of the beam in rapid succession, with angular deviations as large as 180°, must be made. Consequently, previously available variable light transmitters have required relatively long tuning and tracking times, which, in addition, are not constant, but vary directly as a function of the angle differential between the former directional setting and the required directional setting.

Therefore, it is a feature of this invention to provide an optical transmitter which will tune and track received optical signals with very little time loss and with a high degree of accuracy.

It is also a feature of this invention to provide an optical transmitter in which no rotation of the light emitting element around a vertical axis is necessary to aim the light ray at a desired azimuth angle.

It is another feature of this invention to provide an optical transmitter in which the projection of a light beam at a desired azimuth angle is achieved by very small position shifts or tilts of the light emitting element, thereby presenting a very exact and low inertia tracking device.

A further feature of this invention is to provide an optical transmitter and receiver permitting unidirectional reception and return signaling.

It is yet another feature of this invention to provide an optical transmitter which permits the projection of an emitted light ray in a uniform direction to all sides.

It is also a feature of this invention to provide an optical transmitter and receiver which is especially suited for communications lines between vehicles, ships, and the like, and is suitable for military uses, such as the simulation of artillery practice or manuevers, or contact between mobile military units, and as well for civilian purposes, such as, for example, in construction, oil fields, or contact between fishing boats.

It is in addition another feature of this invention to provide an optical transmitter and receiver which may transmit and receive omnidirectionally or monodirectionally, which will detect the angle of an incident light beam, and which may be used to establish laser communication lines by manual or automatic selection, either omnidirectionally or monodirectionally.

SUMMARY OF THE INVENTION

A device for transmitting a narrow beam of light in a variable direction includes a light emitting element which produces a light beam along a vertical axis in the rest position, but is so mounted that the beam may be tilted in any direction away from the vertical axis. A fixed reflector is mounted so that it is rotationally symmetrical with the vertical axis or, alternatively, is substantially rotationally symmetrical with the vertical axis, being of a multi-faceted design. The fixed reflector is placed so that it is coaxial with the vertical axis of the light beam in its rest position. The reflector is so designed that the light beam is deflected to a horizontal direction by the fixed reflector. By tilting the light emitting element a small degree away from the vertical, the light beam may be made to project in a horizontal direction corresponding to the direction of tilt. In this manner a very exact and low inertia means of changing the azimuthal direction in which the light beam is projected is possible.

In a preferred embodiment of the invention, the light emitting element is mounted on a carriage which can be tilted in all directions away from the vertical and which is suspended by a universal joint concentric with the vertical axis. Control of the direction of light beam projection is obtained by means of an electromagnetic deflector, by including a magnetically deflectable element in the carriage and positioning the carriage inside a rotational field stator. The carriage may be held in a rest position concentric with the vertical axis by a spring-biasing or other centering mechanism.

The light transmitter may be equipped with a receiver for omnidirectional reception and return signaling. The signal for providing the direction of deflection for the light emitting element is generated by an azimuth-sensitive receiver which reacts to the angle of incidence of a received light beam. This receiver preferably utilizes a rigidly mounted reflector, which is mounted concentric with the vertical axis and is symmetrical about that axis, or substantially symetrical about that axis with a multi-faceted construction, which deflects horizontal light rays into paths along the vertical axis. A sensor thereby detects the point of incidence of the light beam and an evaluator mechanism calculates the azimuth angle of the incident beam. The reflectors of the transmitter and the receiver are preferably constructed coaxial with each other or are structurally connected.

The transmitter may also be used to transmit a light signal uniformally in all horizontal directions. This is accomplished by constructing the reflector so that the light beam is reflected equally in all azimuth angles when the light emitting element is in its centered position of rest, aligned with the vertical axis. A uniform signal may then be transmitted in all directions, at some reduction in the intensity and range of the transmitted signal.

That portion of the light emitting element which is tiltably mounted with respect to the vertical axis may be the light emitting source itself, such as a laser or semiconductor laser which is combined with an optical focusing mechanism. It is also possible, however, to maintain the light emitting element and the optical focusing mechanism stationary and utilize a tiltably mounted mirror to redirect the light beam toward the reflector.

For communications purposes the light beam may be modulated or pulse code modulated to carry the appropriate information. Similarly, the receiver may be provided with a demodulating mechanism to decode the information contained in a received beam.

The optical elements, including the reflector, which act on the transmitted light ray are preferably so constructed that the transmitted beam has a relatively large angular divergence vertically, but a very small divergence laterally. In this manner, the device may be made quite insensitive to tilting of the vertical axis or to differences in altitude and angle of inclination between a transmitting and a receiving station. Consequently, elaborate measures for vertical stabilization are rendered unnecessary.

BRIEF DESCRIPTION OF THE DRAWINGS

The appended drawings, which form a part of the specification, illustrate one preferred embodiment of the invention and thereby clarify the features, advantages, and objects which are achieved. It should be noted, however, that the drawings present only a typical embodiment of the invention, and therefore should not be considered to limit its scope, since the inventive concept may be realized in other equally effective embodiments.

In the drawings.

DESCRIPTION OF THE PREFERRED EMBODIMENTS

Figure 1:
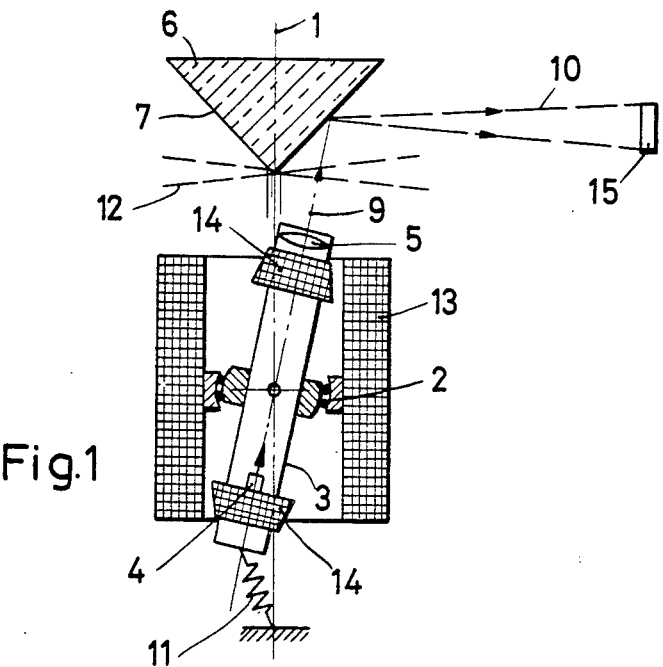
FIG. 1 is a pictorial illustration, in vertical cross section, of a variable optical transmitter in accordance with this invention.

Now referring to the drawings, and first to FIG. 1, a tubular carriage 3 is mounted concentrically with the vertical axis 1 by a universal joint 2, so that the carriage may be freely tilted in any direction away from the vertical, as illustrated. The carriage contains a light source in the form of a semiconductor laser 4 and a lense 5 which focuses the laser beam 9. Concentric with the vertical axis 1 there is mounted a reflector 6, whose mirrorfaceted surface 7 is sloped toward the axis 1 at an angle of 45°. This surface is preferably polygonal in horizontal cross section, with a large number of facets.

The carriage 3, because of its universal joint mounting 2, may be tilted in any desired direction away from the vertical axis 1. Even a small angle of tilt is sufficient to deflect the light beam 9 away from the axis 1 and to cause the beam to strike the surface 7 of reflector 6 at a point so that beam 9 is redirected as light beam 10 in a substantially horizontal direction transverse to the vertical axis 1. In this manner, the horizontal direction of transmission of the light beam 10 in relation to the axis 1 depends only on the direction, but not on the amount, of tilt of the carriage 3. Thus, to change the direction of transmission of the light beam 10, i.e., to change the azimuth angle of the beam with reference to the axis 1, even to make changes involving very wide angles, only very slight changes in the position of the carriage 3 need be made and can thereby be accomplished very rapidly in time.

In the absence of any deflecting force, spring return 11 returns the carriage 3 to its rest position which is concentric with the axis 1. Any time a light beam 10 is to be deflected at any desired azimuth angle, only a constant amount of tilt from the position of rest is necessary. In the centered rest position the light beam 9 will be centered on the apex of the reflector 6 and thereby will be transmitted equally in all directions as light beam 12. By this means, omnidirectional transmission of the light beam may be accomplished with a correspondingly shorter range of operation.

To permit deflection of the carriage 3 in any desired direction from the axis 1, the carriage is encircled by a toroidal field stator 13. Stator 13 will produce a bipolar field in any desired direction with reference to the axis 1 by controlling three 120° phase shifts of an alternating or direct current field, as discussed below with respect to FIG. 3. The carriage 3 is constructed with a magnet element 14, which may be a coil, soft magnetic material, or a bar magnet, so that the carriage may be deflected magnetically by the bipolar field of the stator 13, thereby adjusting the transmitted beam to the desired direction of azimuth. This arrangement permits very rapid positioning and repositioning of the carriage 3 and its light emitting element without manual adjustment, and thus may be used to effect very rapid changes in the direction of transmission of the light beam 10.

The laser 4, the optical lense 5, and the profile of the reflector surface 7, as well as the distance of these elements from each other, should be selected so that the transmitted light beam 10 exhibits a very small angular divergence in a lateral direction but a relatively large divergence vertically, resulting in a narrow but tall light beam cross section, as indicated at 15. This arrangement is advantageous in that the line of communication is maintained even when the axis 1 is somewhat tilted from the vertical or when there are altitude differences between the locations of the transmitting and receiving stations. Consequently, elaborate gyroscopic stabilization of the transmitter is unnecessary.

Figure 2:
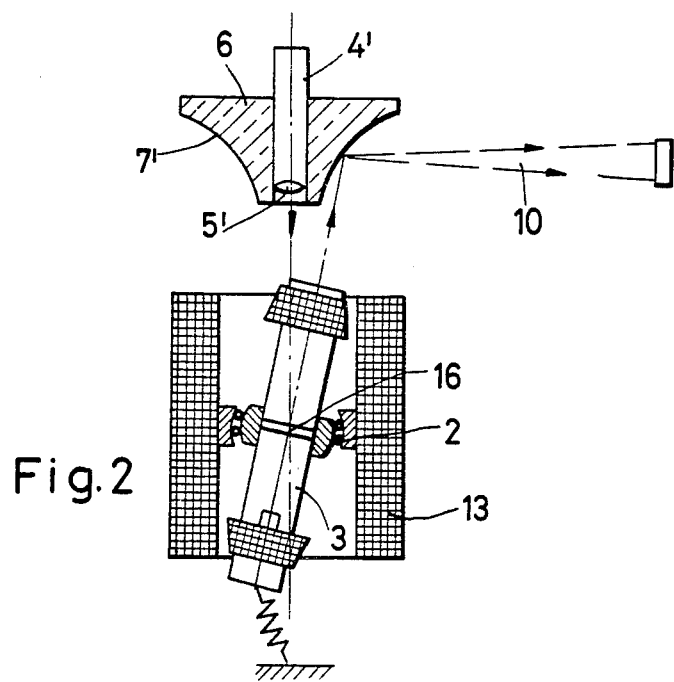
FIG. 2 is a second form of variable optical transmitter, illustrated in vertical cross section, in accordance with this invention.

The transmitter illustrated in FIG. 2 resembles that of FIG. 1, hence identical or corresponding parts are given identical reference numbers. FIG. 2, however, differs from FIG. 1 in that the laser 4' is mounted in a stationary position above the reflector 6, and the transmitted light beam passes through an aperture provided in the reflector 6, through the stationary lense 5', and strikes a mirror 16 affixed to the tiltable carriage 3. This mirror reflects the beam back to the reflector surface 7', from which it is transmitted as the transverse light beam 10. In this instance the reflector surface 7' exhibits a profile which is parabolically curved when seen in vertical cross section. The spring return for the carriage 3 may be omitted, since the return action may also be obtained by an appropriate control of the rotational field of the stator 13 or, alternatively, by a coaxially oriented permanent magnet. Note that in the transmitter configuration of FIG. 2, the required angular amount of tilt of the carriage 3 is only half as large as for the transmitter illustrated in FIG. 1.

It should be evident that the figures are schematic in nature and, as such, do not show the actual dimensions of the various elements and the spacing between them. It should also be noted that the device may be constructed in such a way that much smaller degrees of tilt of the carriage 3 than those illustrated in the figures will suffice to make the light beam 10 strike the reflector 6 so that the beam is projected at the correct angle of azimuth. Within the confines of the maximum angle of tilt required, the tiltable carriage 3 may be constructed entirely in a conical shape, spherically, or in any other shape that exhibits a favorable inertial moment.

Figure 3:
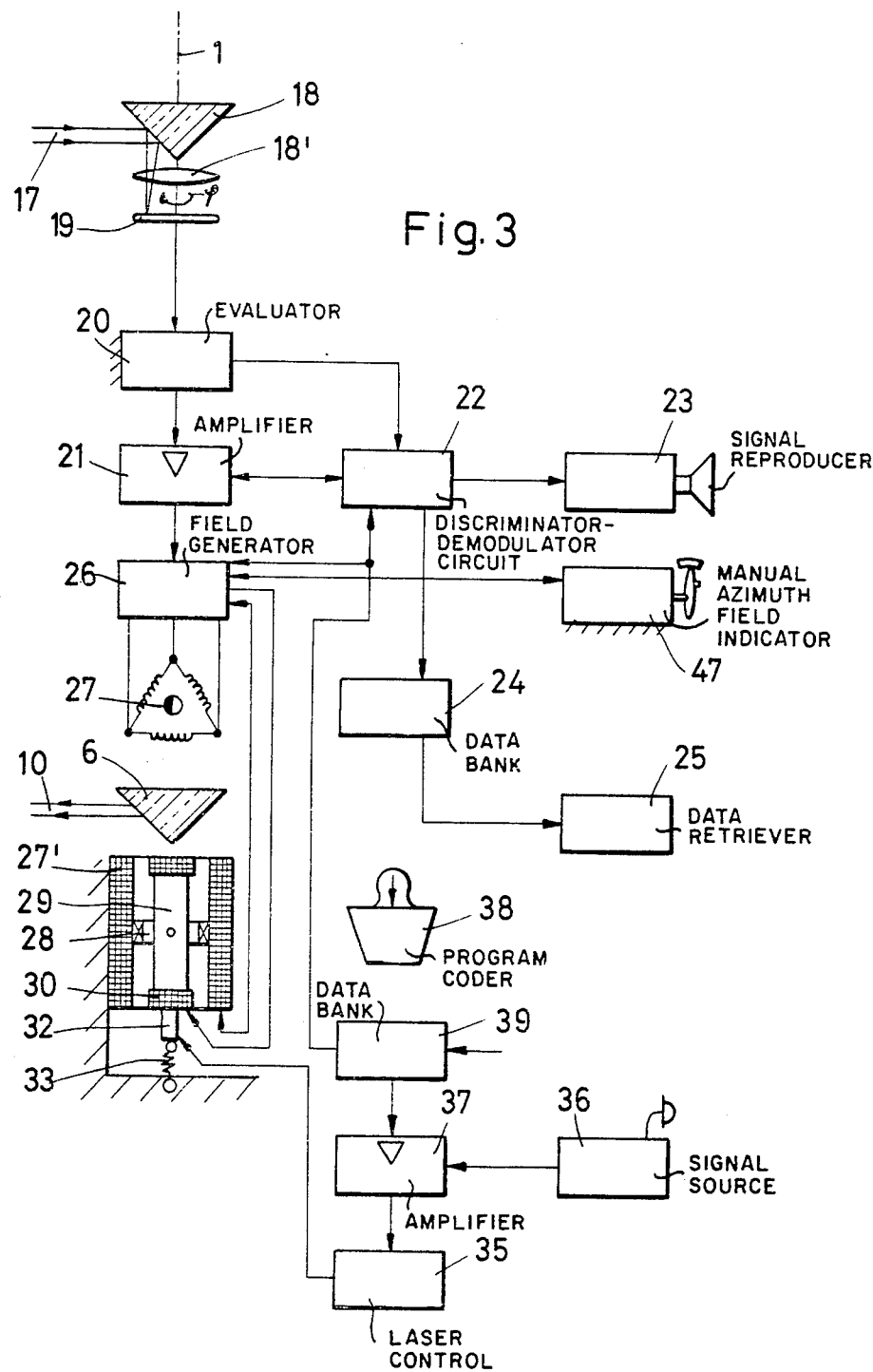
FIG. 3 is a block diagram illustrating a light beam transmitting and receiving device constructed in accordance with this invention.

In FIG. 3, the arrangement of a combination receiver and transmitter in accordance with the present invention is illustrated in block diagram form. With this apparatus, the direction of incidence of a received light beam may be determined and a return beam may be transmitted in the same direction.

An incoming light beam is illustrated at 17, being received by the apparatus at any given azimuth angle with respect to vertical axis 1. Light beam 17 strikes a rotationally symmetrical or substantially rotationally symmetrical receiving reflector 18. The reflector surface, which is inclined toward the axis 1, deflects the light beam parallel to the axis and into a receiver 19 which is located coaxial with axis 1. Receiver 19 is a sensor which is oriented cross-axially and which is capable of locating the point of incidence of the light beam, which is focused onto receiver 19 by the optical element 18'. The receiver 19 may be constructed of a ring or matrix of photodiodes or, alternatively, may be an electronic ray scanning screen of the vidicon type.

The initial signals from position sensitive sensor 19 are supplied to an evaluator 20, which utilizes the x and y coordinates of the received position in sensor 19 to calculate the azimuth angle of the point of incidence of beam 17 with reference to the axis 1. The azimuth signal generated by the evaluator 20 is then fed into a discriminator-demodulator circuit 22, where the signal is processed for reproduction by signal reproduction stage 23. The signal may be reproduced by an azimuth indicator with a digital dial, an analog dial using a needle, or by an L.E.D. circuit. A signal indicating the azimuth angle of the received beam may also be reproduced as an acustical signal to be transmitted to earphones or a loud speaker. For the purpose of a later response or reproduction, or for storage during multiple signal reception, the signal may be fed from the signal processor 22 into a data bank 24. The signal then may be reproduced in the data retriever 25. A device of this kind is useful when signals arriving simultaneously from various directions must be received by a discriminator and separately processed.

The signal from the evaluator 20, which corresponds to the azimuth angle from which the light beam was received, is also passed via amplifier 21 into the field generator 26 to establish an azimuth direction field. The azimuth direction field is a rotational field generated by the techniques of synchro-engineering, preferably with semiconductor modules. A ScottTrafo circuit, which is not shown here, establishes the required phase condition for the rotational field stator shown by the circuit symbol at 27. Rotational field systems are well known to those skilled in the art and are frequently used to generate electrical waves, in control engineering for synchros, and in a variant of coil construction known as a resolver. Such a rotational field system establishes a bipolar field which is oriented by the phase condition through three 120°-shifted phases of an alternating or direct current field. A carriage 29 is mounted on a tiltable universal joint 28 within the rotational field stator 27'. The carriage includes a vertically polarized bar magnet, soft magnetic material, or a bipolar electromagnet. When the direction of polarity of the stator field is altered, corresponding to the phase condition produced by the field generator 26, the precision mounted carriage 29 is caused to tilt about the universal joint 28 and thereby is deflected with the required precision and with the proper orientation to axis 1. As illustrated in FIGS. 1 and 2, the carriage 29 carries either the laser 32, preferably a semiconductor laser, or a mirror toward which a stationary laser beam is directed.

A return mechanism 33, which is shown by way of example as a spring-biased return, establishes a central position from which tracking for any desired orientation may be obtained through a small angle deviation with virtually equal setting times for any directional setting. The reflector 6 will transmit the outgoing light beam 10 precisely in the direction of the received light beam 17.

The laser 32 is powered by the laser control 35, which in turn is controlled by the signal source 36 via the intermediate amplifier 37. The signal source 36 is an intermediate element and processes an acoustic signal, which may be received from a microphone, for example, so that the signal may be applied to the light beam as a pulse code modulated signal. Additionally, however, provision is made for stored and preprogrammed answering signals which may be released automatically. For this mode of operation a program coder 38 is provided which contains a key program that may be set up daily or may be reprogrammed at set time intervals to serve as an encoding device whenever a confidential operation with alternative codings is required. The data bank readout 39 delivers the signal, for example the code of the day, to the discriminator 22 for checking and then, if it is verified and released by the discriminator, transmits the signal to the amplifier 37 for delivery to laser control 35.

When the light beam is transmitted while the carriage 29 is its central rest position, as shown in FIG. 3, the light beam is sent equally in all horizontal directions. Because of the reduced energy output involved, a smaller distance range results for this type of operation. This mode of operation is suitable for signal transmissions specifically requiring a limited range, for example where communications are made during spatially restricted close formation manuevers of military columns. Such a mode also provides all around communication over a short distance, with a usual range of several hundred meters.

When transmission must be made to a particular destination at a known location, a gauge may be employed which, in combination with a manual azimuth field indicator 47, adjusts the tiltable carriage 29 to transmit in the desired direction. The azimuth indicator 47 may be a synchro with a scale indicating azimuth angles and connected to the carriage. In this mode of operation the stator is preferably directed toward the axis of suspension of the movable element 29. The rotational field of the azimuth indicator 47 is synchronized by the direction finder and aligned with the rotational field stator 27, which determines the proper polarity for azimuth.

Although the invention has been described with reference to particular embodiments illustrated in the figures, other embodiments within the scope of the invention will be apparent to a person skilled in the art. One variation, for example, would employ a large number of light conducting glass fibers arranged to terminate on the downward surface of the reflector 6 which faces the mirror 16 in FIG. 2. These fibers may then terminate at their opposite ends with a corresponding number of individual lasers, preferably semiconductor lasers, which replace the single laser 4 as illustrated in FIG. 1. In this alternative arrangement, the output and concentration of light necessary for long distance operation may be produced by using a large number of inexpensive semiconductor lasers.

What is claimed is:

1. A variable optical transmitter, comprising:
   means to project a light beam along a vertical axis;
   means to deflect said light beam in any desired direction from said vertical axis; and
   a transmitting reflector coaxial with said vertical axis and substantially symmetrical about said axis, said reflector adapted to reflect the light beam in a substantially horizontal direction corresponding in azimuth angle to the direction of deflection of said light beam.

2. The optical transmitter of claim 1, wherein:
   said transmitting reflector will reflect the light beam uniformly in all horizontal directions when said light beam is projected along the vertical axis.

3. The optical transmitter of claim 1, wherein:
   said light projecting means and said transmitting reflector are so arranged that the horizontally transmitted light beam exhibits a relatively small horizontal angle of divergence and a relatively large vertical angle of divergence.

4. The optical transmitter of claim 1, further comprising:
   a carriage for mounting said light beam projecting means, said carriage being tiltably suspended by a universal joint.

5. The optical transmitter of claim 4, further comprising:
   a return mechanism for urging the carriage toward a rest position with the light beam projected along said vertical axis.

6. The optical transmitter of claim 4, wherein said light beam projecting means comprises:
   a laser; and
   an optical focusing element for said laser.

7. The optical transmitter of claim 1, further comprising: a stationary laser; a carriage, said carriage being tiltably suspended by a universal joint; and a mirror mounted on said carriage and adapted to reflect said light beam from said laser to said transmitting reflector.

8. The optical transmitter of claim 4, wherein said deflecting means comprises:
   an electromagnetic deflecting means.

9. The optical transmitter of claim 8, wherein said deflecting means comprises:
   a magnetically deflectable core mounted on said carriage; and
   a rotational field stator surrounding said magnetically deflectable core.

10. The optical transmitter of claim 9, further comprising:
    an azimuth-sensitive receiver, said receiver providing a control signal for said deflecting means responsive to the direction from which an incident light beam is received.

11. The optical transmitter of claim 10, wherein said azimuth-sensitive receiver comprises:
    a receiving reflector coaxial with said vertical axis and substantially symmetrical about said axis, said reflector adapted to reflect a received light beam in a substantially vertical direction;
    a sensor coaxial with said vertical axis and adapted to respond to a light beam reflected from said receiving reflector; and
    an evaluator operably connected to said sensor to calculate the azimuth angle of said received light beam.

* * * * *